(12) United States Patent
Sato et al.

(10) Patent No.: US 8,730,339 B2
(45) Date of Patent: May 20, 2014

(54) CAMERA

(75) Inventors: Shigemasa Sato, Yokohama (JP);
Akihiko Takahashi, Kawasaki (JP);
Setsu Mitsuhashi, Tokyo (JP); Tetsuo In, Yokohama (JP)

(73) Assignee: Nikon Corporation, Tokyo (JP)

( * ) Notice: Subject to any disclaimer, the term of this patent is extended or adjusted under 35 U.S.C. 154(b) by 205 days.

(21) Appl. No.: 12/708,281

(22) Filed: Feb. 18, 2010

(65) Prior Publication Data

US 2010/0225784 A1     Sep. 9, 2010

(30) Foreign Application Priority Data

Feb. 24, 2009  (JP) ................................. 2009-041369
Nov. 26, 2009  (JP) ................................. 2009-268930

(51) Int. Cl.
*H04N 5/225* (2006.01)
*G03B 7/00* (2006.01)

(52) U.S. Cl.
USPC ....................................... 348/220.1; 348/362

(58) Field of Classification Search
USPC .................... 348/362, 367, 368, 220.1, 221.1
See application file for complete search history.

(56) References Cited

U.S. PATENT DOCUMENTS

2003/0189647 A1* 10/2003 Kang ...................... 348/207.99
2006/0256203 A1* 11/2006 Honma ...................... 348/220.1

FOREIGN PATENT DOCUMENTS

| JP | B-3103699 | 8/2000 |
| JP | A-2001-257926 | 9/2001 |
| JP | A-2005-79814 | 3/2005 |
| JP | A-2007-318773 | 12/2007 |

OTHER PUBLICATIONS

May 22, 2012 Office Action issued in Japanese Patent Application No. 2009-268930 (with translation).

* cited by examiner

*Primary Examiner* — Daniel M Pasiewicz
*Assistant Examiner* — Mark Monk
(74) *Attorney, Agent, or Firm* — Oliff PLC

(57) ABSTRACT

An image-capturing device includes: an instruction unit that issues a photographing instruction signal; an image sensor that obtains frame images over predetermined time intervals; a storage unit into which a plurality of frame images obtained via the image sensor are sequentially stored; a save candidate designation unit that designates a plurality of frame images obtained before and after an output of the photographing instruction signal among a plurality of frame images stored in the storage unit as save candidate images that may be saved into a recording medium; and a control unit that controls the save candidate designation unit so as to designate as the save candidates a plurality of frame images obtained before and after a second photographing instruction signal issued within a predetermined length of time following the output of the photographing instruction signal.

10 Claims, 7 Drawing Sheets

CAMERA

INCORPORATION BY REFERENCE

The disclosures of the following priority applications are herein incorporated by reference:
Japanese Patent Application No. 2009-041369 filed Feb. 24, 2009
Japanese Patent Application No. 2009-268930 filed Nov. 26, 2009

BACKGROUND OF THE INVENTION

1. Field of the Invention

The present invention relates to an image-capturing device.

2. Description of Related Art

Japanese Laid Open Patent Publication No. 2001-257926 discloses a camera that accumulates in sequence images consecutively captured over predetermined time intervals following a first shutter release into a buffer memory and then, in response to a second shutter release, saves into a memory card the images in "pre-frames", having been captured prior to the second shutter release among the accumulated images and also the images in "post-frames" captured following the second shutter release.

SUMMARY OF THE INVENTION

The technology in the related art, conceived without taking into account a situation in which the user may wish to retry a second shutter release by performing a "double-depression operation", may fail to secure images captured immediately before and after the subsequent second shutter release.

According to the 1st aspect of the present invention, an image-capturing device comprises: an instruction unit that issues a photographing instruction signal; an image sensor that obtains frame images over predetermined time intervals; a storage unit into which a plurality of frame images obtained via the image sensor are sequentially stored; a save candidate designation unit that designates a plurality of frame images obtained before and after an output of the photographing instruction signal among a plurality of frame images stored in the storage unit as save candidate images that may be saved into a recording medium; and a control unit that controls the save candidate designation unit so as to designate as the save candidates a plurality of frame images obtained before and after a second photographing instruction signal issued within a predetermined length of time following the output of the photographing instruction signal.

According to the 2nd aspect of the present invention, it is preferred that in the image-capturing device according to the 1st aspect, the save candidate designation unit normally designates A sheets of frame images obtained prior to the output of the photographing instruction signal and B sheets of frame images obtained after the output of the photographing instruction signal as the save candidates; and if a second photographing instruction signal is issued before the B sheets of frame images are obtained following the output of a first photographing instruction signal, the control unit controls the save candidate designation unit so as to designate a plurality of frame images obtained before and after the output of the second photographing instruction signal as the save candidates.

According to the 3rd aspect of the present invention, it is preferred that in the image-capturing device according to the 2nd aspect, if the second photographing instruction signal is issued at a time point at which C (A>C) sheets of frame images, fewer than B sheets, have been obtained following the output of the first photographing instruction signal, the control unit controls the save candidate designation unit so as to designate as the save candidates most recent (A−C) sheets of frame images among the A sheets of frame images having been obtained prior to the output of the first photographing instruction signal, the C sheets of frame images having been obtained after the output of the first photographing instruction signal and B sheets of frame images obtained after the output of the second photographing instruction signal.

According to the 4th aspect of the present invention, it is preferred that in the image-capturing device according to the 2nd aspect, if the second photographing instruction signal is issued at a time point at which C sheets of frame images, fewer than B sheets, have been obtained following the output of the first photographing instruction signal, the control unit controls the save candidate designation unit so as to designate as the save candidates most recent (A−D) sheets of frame images (A>D≥B) among the A sheets of frame images having been obtained prior to the output of the first photographing instruction signal, the C sheets of frame images having been obtained after the output of the first photographing, instruction signal and D sheets of frame images obtained after the output of the second photographing instruction signal.

According to the 5th aspect of the present invention, it is preferred that in the image-capturing device according to the 2nd aspect, if the second photographing instruction signal is issued at a time point at which C sheets of frame images, fewer than B sheets, have been obtained following the output of the first photographing instruction signal, the control unit controls the save candidate designation unit so as to designate as the save candidates the C sheets of frame images having been obtained after the output of the first photographing instruction signal and B sheets of frame images obtained after the output of the second photographing instruction signal.

According to the 6th aspect of the present invention, it is preferred that in the image-capturing device according to the 2nd aspect, if the second photographing instruction signal is issued at a time point at which C (A>C) sheets of frame images, fewer than B sheets, have been obtained following the output of the first photographing instruction signal, the control unit controls the save candidate designation unit so as to designate as the save candidates specific (A−C) sheets of frame images among the A sheets of frame images having been obtained prior to the output of the first photographing instruction signal, C sheets of frame images having been obtained after the output of the first photographing instruction signal and the C sheets of frame images obtained after the output of the second photographing instruction signal.

According to the 7th aspect of the present invention, it is preferred that in the image-capturing device according to the 6th aspect, the control unit controls the save candidate designation unit so as to select as the (A−C) sheets of frame images either (A−C) sheets of frame images in a compressed state with largest volumes of information among the A sheets of frame images in the compressed state with an image with a largest volume of information selected first or (A−C) sheets of frame images achieving highest levels of contrast in focus adjustment target areas each set in correspondence to a given image among the A sheets of frame images with an image with the highest contrast selected first.

According to the 8th aspect of the present invention, it is preferred that in the image-capturing device according to the 1st aspect, the control unit controls the save candidate designation unit so as to ensure that the A sheets of frame images are greater in quantity than the B sheets of frame images.

According to the 9th aspect of the present invention, it is preferred that the image-capturing device according to the 1st aspect further comprises: a save processing unit that saves into the recording medium the plurality of frame images into a recording medium, and the save processing unit saves all the save candidates designated by the save candidate designation unit or each candidate among the save candidates indicated in an operation signal output from an operation member.

According to the 10th aspect of the present invention, an image-capturing device comprises: an instruction unit that issues a photographing instruction signal; an image sensor that obtains frame images over predetermined time intervals; a storage unit into which a plurality of frame images obtained via the image sensor are sequentially stored; a save candidate designation unit that designates a plurality of frame images obtained before and after an output of the photographing instruction signal among the plurality of frame images stored in the storage unit as save candidate images that may be saved into a recording medium; and a control unit that controls the save candidate designation unit so as to designate as the save candidates a plurality of frame images obtained before and after an output of each photographing instruction signal if a second photographing instruction signal is issued within a predetermined length of time following the output of the photographing instruction signal.

According to the 11th aspect of the present invention, it is preferred that in the image-capturing device according to the 10th aspect, the save candidate designation unit normally designates A sheets of frame images obtained prior to the output of the photographing instruction signal and B sheets of frame images obtained after the output of the photographing instruction signal as the save candidates; the storage unit continuously takes in frame images obtained at the image sensor sequentially for storage after storing the B sheets of frame images following the output of a first photographing instruction signal; and if a second photographing instruction signal is issued before additional A sheets of frame images are obtained in succession to the B sheets of frame images having been obtained following the output of the first photographing instruction signal, the control unit controls the save candidate designation unit so as to designate as the save candidates a plurality of frame images obtained before and after the output of each of the first photographing instruction signal and the second photographing instruction signal.

According to the 12th aspect of the present invention, it is preferred that in the image-capturing device according to the 11th aspect, the control unit controls the save candidate designation unit so as to double-designate some frame images among the B sheets of frame images obtained after the output of the first photographing instruction signal also as part of a group of A sheets of frame images obtained prior to the output of the second photographing instruction signal.

According to the 13th aspect of the present invention, it is preferred that in the image-capturing device according to the 12th aspect, the save candidate designation unit designates as the save candidates images in a first file containing the plurality of frame images obtained before and after the output of the first photographing instruction signal and also designates as the save candidates images in a second file containing the plurality of frame images obtained before and after the output of the second photographing instruction signal.

According to the 14th aspect of the present invention, it is preferred that in the image-capturing device according to the 13th aspect, the save candidate designation unit performs one of; (1) including the some frame images both in the first file and in the second file; (2) including the some frame images only one of the first file and the second file and referencing the some frame images from another file; and (3) reducing the data size of the some frame images and then adding the some frame images with the reduced data size into at least the second file.

According to the 15th aspect of the present invention, it is preferred that in the image-capturing device according to the 11th aspect, any additional images, stored into the storage unit sequentially after storing the B sheets of frame images following the output of the first photographing instruction signal, are each written over an oldest frame image among the A sheets of frame images having been obtained prior to the output of the first photographing instruction signal.

BRIEF DESCRIPTION OF THE DRAWINGS

FIG. 2 illustrates the timing with which images are obtained in the pre-capture photographing mode, with FIG. 2A presenting a timing chart for an operation executed under normal conditions and FIG. 2B presenting a timing chart for an operation executed under double-depression conditions;

FIG. 3 illustrates the timing with which images are obtained in variation 1, with FIG. 3A presenting a timing chart for the operation executed under normal conditions and FIG. 3B presenting a timing chart for the operation executed under double-depression conditions;

FIG. 4 illustrates the timing with which images are obtained in the variation 2, with FIG. 4A presenting a timing chart for normal operation and FIG. 4B presenting a timing chart for the operation executed under double-depression conditions;

FIG. 5 illustrates the timing with which images are obtained in the variation 3, with FIG. 5A presenting a timing chart for the operation executed under normal conditions and FIG. 5B presenting a timing chart for a double-depression operation;

DESCRIPTION OF PREFERRED EMBODIMENTS

The following is a description of the embodiments of the present invention given in reference to the drawings.

First Embodiment

Figure 1:
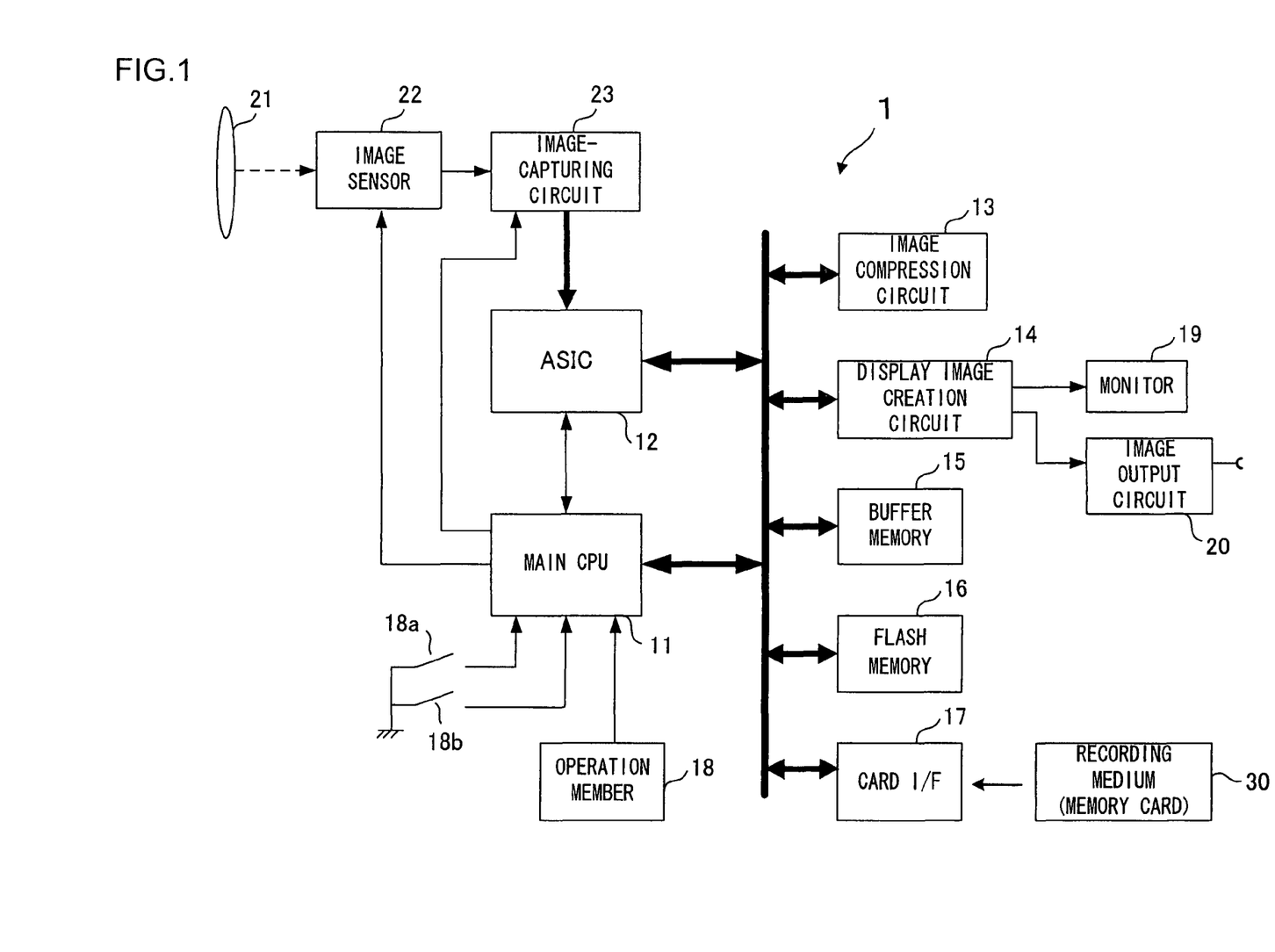
FIG. 1 is a block diagram pertaining to the electronic camera achieved in an embodiment of the present invention.

FIG. 1 is a block diagram showing the essential components constituting an electronic camera 1 achieved in the embodiment of the present tension. The electronic camera 1 is controlled by a main CPU 11.

A subject image is formed through a photographic lens 21 onto an image-capturing surface of an image sensor 22. The image sensor 22, which may be constituted with a CCD image sensor or a CMOS image sensor, outputs imaging signals obtained by capturing the subject image formed on the image-capturing surface, to an image-capturing circuit 23. The image-capturing circuit 23 executes analog processing (such as gain control) on the photoelectric conversion signals output from the image sensor 22 and also converts the analog image-capturing signals to digital data at a built-in A/D conversion circuit.

The main CPU 11 executes predetermined arithmetic operations by using signals input thereto from various blocks and outputs control signals, which are generated based upon the arithmetic operation results, to the individual blocks. An image processing circuit 12, which may be constituted with, for instance, an ASIC, executes image processing on the digital imaging signals input thereto from the image-capturing circuit 23. The image processing executed at the image processing circuit 12 includes, for instance, edge enhancement processing, color temperature adjustment (white balance adjustment) processing and format conversion processing executed on the imaging signals.

An image compression circuit 13 executes image compression processing so as to compress the imaging signals having undergone the processing at the image processing circuit 12 into, for instance, the JPEG format at a predetermined compression rate. A display image creation circuit 14 generates display signals to be used when displaying the captured image at a liquid crystal monitor 19.

At the liquid crystal monitor 19, constituted with a liquid crystal panel, an image and an operation menu screen or the like is brought up on display based upon display signals input thereto from the display image creation circuit 14. An image output circuit 20 generates, based upon the display signals input thereto from the display image creation circuit 14, display signals that will enable an external display device to display an image, an operation menu screen or the like, and outputs the display signals thus generated.

A buffer memory 15, where data yet to undergo the image processing, data having undergone the image processing and data currently undergoing the image processing are temporarily stored, is also used to store an image file yet to be recorded into a recording medium 30 or an image file having been read out from the recording medium 30. The buffer memory 15 in the embodiment is also used when temporarily storing pre-captured images obtained at the image sensor 22 at a predetermined frame rate before a photographing instruction is issued (before the shutter release button is pressed all the way down). The "pre-captured" images are to be described in detail later.

In a flash memory 16, a program executed by the main CPU 11, data needed when the main CPU 11 executes processing and the like are stored. The content of the program or the data stored in the flash memory 16 can be supplemented or modified based upon an instruction issued by the main CPU 11.

A card interface (I/F) 17 includes a connector (not shown) at which the storage medium 30 such as a memory card is connected. In response to an instruction issued by the main CPU 11, data can be written into the connected recording medium 30 or data in the connected recording medium 30 can be read out at the card interface 17. The recording medium 30 may be constituted with a memory card having a built-in semiconductor memory or a hard disk drive.

An operation member 18, which includes various buttons and switches at the electronic camera 1, outputs an operation signal corresponding to operational details of an operation performed at a specific button or switch constituting the operation member, such as a switching operation at a mode selector switch, to the main CPU 11. A halfway press switch 18a and a full press switch 18b each output an ON signal to the main CPU 11 by interlocking with depression of the shutter release button (not shown). The ON signal (halfway press operation signal) is output from the halfway press switch 18a as the shutter release button is depressed to a point roughly halfway through the full travel of the shutter release button and the ON signal output is cleared once the shutter release button held halfway down is released. The ON signal (full press operation signal) is output from the full press switch 18b as the shutter release button is depressed through the full travel of the shutter release button and the ON signal output is cleared once the shutter release button held all the way down is released. The halfway press operation signal constitutes an instruction for the main CPU 11 to start preparing for a photographing operation. The full press operation signal constitutes an instruction for the main CPU 11 to start obtaining an image to be recorded.

(Photographing Modes)

The electronic camera 1 may assume a regular photographing mode or a pre-capture photographing mode. The electronic camera 1 set in the regular photographing mode obtains a single photographic image each time a full press operation signal is output and records the photographic image into the recording medium 30. The electronic camera 1 set in the pre-capture photographing mode, on the other hand, obtains a plurality of consecutive photographic still images at a rate of 120 frames/second (120 FPS) at a high shutter speed (e.g., higher than $\frac{1}{125}$ seconds) in response to the halfway press operation signal. Then, upon receiving the full press operation signal, the electronic camera 1 in the pre-capture photographing mode records predetermined numbers of frame images, captured before and after the reception of the full press operation signal, into the recording medium 30. One photographing mode can be switched to the other in response to an operation signal output from the operation member 18.

(Reproduction Mode)

The electronic camera 1 in the reproduction mode is able to reproduce and display at the liquid crystal monitor 19 a single image or a predetermined number of images having been recorded in either of the photographing modes described above.

Figure 2A:
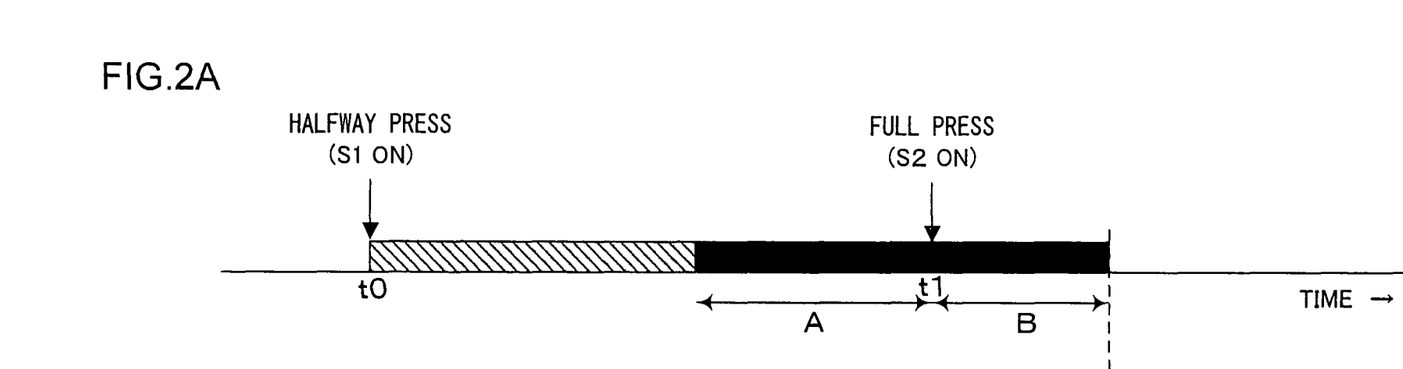
Figure 2B:
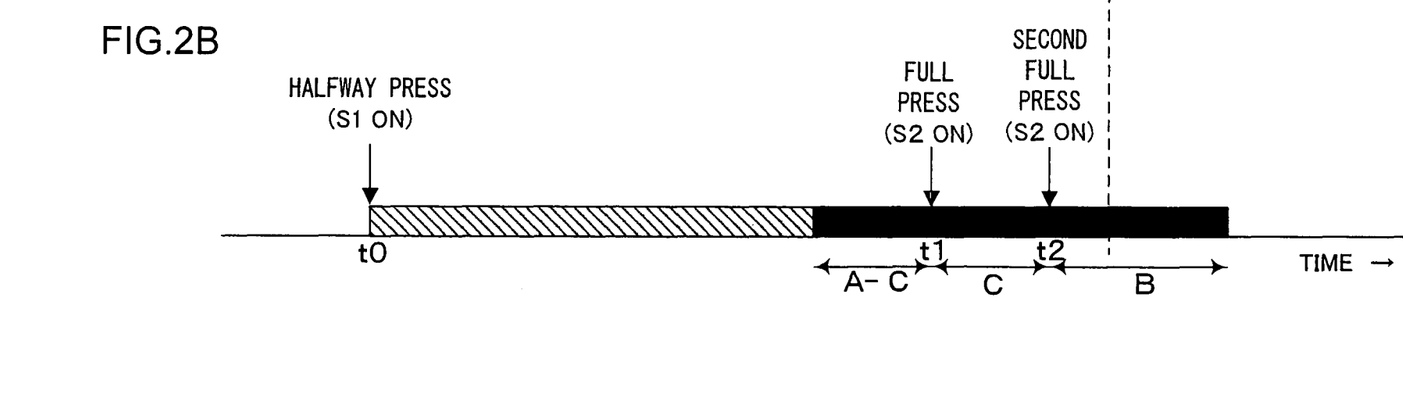

Since the pre-capture photographing mode is a feature characterizing the embodiment, the following explanation focuses on the operation executed in the pre-capture photographing mode. FIGS. 2A and 2B illustrate the timing with which images are obtained in the pre-capture photographing mode.

(Pre-Capture Photographing Operation Executed Under Normal Circumstances)

As a halfway press operation signal is input at a time point t0 in FIG. 2A, the main CPU 11 starts shutter release standby processing. During the shutter release standby processing, the main CPU 11 executes exposure calculation and focus adjustment by capturing the subject images at a frame rate of, for instance, 120 frames/second (120 FPS) and stores the image data thus obtained sequentially into the buffer memory 15.

A predetermined memory capacity indicating the memory space available in the buffer memory 15 for the pre-capture photographing operation is allocated in advance. If the number of frame images stored into the buffer memory 15 following the time point t0 reaches a predetermined value and the memory space taken up by these frame images exceeds the predetermined memory capacity, the main CPU 11 deletes older frame images by writing a new frame image over the oldest frame image. Through these measures, the memory space in the buffer memory 15 used for the pre-capture photographing operation can be controlled to match the predetermined capacity allocation.

As a full press operation signal is input at a time point t1, the main CPU 11 starts shutter release processing. During the shutter release processing, the main CPU 11 individually records A sheets of frame images having been captured prior to the time point t1 and B sheets of frame images captured following the time point t1 into the recording medium 30 by correlating the frame images captured prior to and following the time point t1. The filled bar in FIG. 2A represents the period of time over which the (A+B) sheets of frame images to be recorded into the recording medium 30 are obtained. The hatched bar represents the period of time over which frame images that are first stored into the buffer memory 15 but are subsequently deleted through overwrite, are obtained.

It is to be noted that either a first recording method or a second recording method, selected in response to an operation signal from the operation member 18, may be adopted when recording frame images. When the first recording method is selected, the main CPU 11 records all the (A+B) sheets of frame images into the recording medium 30. In the second recording method, on the other hand, the main CPU 11 records only a specific frame image indicated by the user, among the (A+B) sheets of frame images, into the recording medium 30. The embodiment is described by assuming that the first recording method has been selected.

In the second recording method, the main CPU 11 brings up on display at the liquid crystal monitor 19 a single frame image at a time or a predetermined number of frame images (e.g., four frame images) at a time among the (A+B) sheets of frame images before recording any of the frame images into the recording medium 30. Then, the main CPU 11 records only a specific frame image selected via an operation signal output from the operation member 18 into the recording medium 30. The filled bar in the timing chart of the operation executed by adopting the second recording method will represent the period of time over which the (A+B) sheets of frame images, i.e., save candidates, any of which may be recorded into the recording medium 30, are obtained.

(Pre-Capture Photographing Operation Executed Under Double-Depression Conditions)

FIG. 2B indicates the timing with which frame images are obtained as a second shutter release button full press operation is performed at a time point t2 before the operation for capturing the B sheets of frame images, having started at the time point t1, is completed. Under these circumstances, in response to the second full press operation signal input thereto, the main CPU 11 executes double-depression shutter release processing. During the double-depression shutter release processing, the main CPU 11 individually records (A−C) sheets of frame images, i.e., the newer frame images among the frame images having been captured before the time point t1, which have not been deleted through overwrite, C sheets of frame images having been captured during the period elapsing between the time point t1 and the time point t2 into the recording medium 30 and B sheets of frame images captured following the time point t2, by correlating them to one another.

Now, in reference to FIG. 2A, the time lag between the time point t1 and the time point t2 (the time lag during which the shutter release button full press operation performed at the time point t2 is allowed to be judged as a second depression) is explained. The time lag within which the user is judged to have performed the second depression operation must fit within the period of time elapsing while capturing the B sheets of frame images, which is part of the entire pre-capture period (the period of time over which the A+B sheets of frame images are captured). Namely, as long as the time lag between the time point t1 and the time point t2 is less than the length of time over which the B sheets of frame images are captured, the main CPU 11 determines that the shutter release button full press operation performed at the time point t2 is a "second depression operation". However, the length of the "period of time elapsing while capturing the B sheets of frame images" fluctuates in correspondence to the length of the "period of time elapsing while capturing the A sheets of frame images".

For instance, assuming that the length of time corresponding to the "A+B" sheets of frame images is 2 seconds and that the length of time corresponding to the A sheets of frame images is 0.5 seconds, the period of time during which an affirmative decision that a double-depression operation has been performed can be made (the length of time corresponding to the B sheets of frame images) will be 1.5 seconds. If, on the other hand, the length of time corresponding to the A sheets of frame images is 0 seconds, the period of time during which an affirmative decision that a double-depression operation has been performed can be made (the length of time corresponding to the B sheets of frame images) will last 2 seconds.

It is to be noted that the photographer will typically perform a second depression operation within approximately one second following the initial shutter release operation and accordingly, a fixed length of time of approximately one second may be set as a predetermined period of time during which the decision as to whether or not a double-depression operation has been performed is made.

The filled bar in FIG. 2B represents the period of time over which the {(A−C)+C+B} sheets of frame images, to be recorded into the recording medium 30, are obtained. The hatched bar represents the period of time over which frame images that are first stored into the buffer memory 15 but are subsequently deleted through overwrite are obtained.

It is to be noted that the following aspect of the operation executed in conjunction with the second recording method is identical to that of the normal pre-capture photographing operation. Namely, the main CPU 11 brings up on display at the liquid crystal monitor 19 a single frame image at a time or a predetermined number of frame images (e.g., four frame images) at a time among the {(A−C)+C+B} sheets of frame images before recording any of the frame images into the recording medium 30. Then, the main CPU 11 records only a specific frame image selected via an operation signal output from the operation member 18 into the recording medium 30. The filled bar in the timing chart of the operation executed by adopting the second recording method will represent the period of time over which the {(A−C)+C+B} sheets of frame images, i.e., save candidates any of which may be recorded into the recording medium 30, are obtained.

The following advantages are achieved in the embodiment described above.

(1) The electronic camera 1 includes the main CPU 11, the image sensor 22, which obtains frame images over predetermined time intervals, and the buffer memory 15 into which a plurality of frame images obtained via the image sensor 22 are sequentially stored. The main CPU 11 issues a photographing instruction signal and designates the plurality of frame images obtained before and after the photographing instruction signal is issued, among the plurality of frame images stored in the buffer memory 15, as save candidate images that may be saved into the recording medium 30. In addition, if another photographing instruction signal is issued within a predetermined period of time following the output of the initial photographing instruction signal, the main CPU 11 executes control so as to designate the plurality of frame images obtained before and after the subsequent photographing instruction signal is issued as save candidate images. As a result, an image-capturing device capable of saving a plurality of optimal frame images even when a second photographing instruction is issued following the initial photographing instruction is provided.

(2) Under normal circumstances, the main CPU 11 designates A sheets of frame images obtained before a photographing instruction signal is issued and B sheets of frame images obtained after the photographing instruction signal is issued as save candidates. If a second photographing instruction signal is issued before the B sheets of frame images are obtained following the output of the initial photographing instruction signal, the main CPU 11 executes control so as to designate the plurality of frame images obtained before and after the second photographing instruction signal is issued as save candidates. Thus, an image-capturing device capable of saving the plurality of optimal frame images even when a second photographing instruction signal is issued before the acquisition of the B sheets of frame images, to be obtained following the output of the initial photographing instruction under normal circumstances, is completed is provided.

(3) The main CPU 11 executes the following control if a second photographing instruction signal is issued at a time point at which C (A>C) sheets of frame images, fewer than B sheets, have been obtained following the output of the initial photographing instruction signal. Namely, the main CPU 11 executes control so as to designate as save candidates the most recent (A−C) sheets of frame images among the A sheets of frame images having been obtained prior to the output of the first photographing instruction signal, C sheets of frame images obtained after the output of the first photographing instruction signal and B sheets of frame images obtained after the second photographing instruction signal is issued. Through these measures, it is ensured that regardless of whether or not a second photographing instruction signal is issued, a uniform number of frame images is obtained before and after a photographing instruction signal is issued.

(4) The number (A) takes a value greater than the number (B). It is known that while there is a tendency among photographers to perform shutter release operations slightly early, there are also many photographers who tend to perform shutter release operations slightly late relative to the optimal shutter release timing.

Test data collected from a considerable number of subjects (photographers) indicate that the delay with which a photographer performs the actual shutter release operation following the intended shutter release timing (the desired image-capturing moment), i.e., the length of time elapsing between the intended moment and the actual shutter release operation (shutter release switch on), is usually up to approximately 0.4 seconds.

The data also indicate that the extent by which a photographer performs the actual shutter release operation prematurely ahead of the intended moment (the desired image-capturing moment), i.e., the length of time elapsing in between the actual shutter release operation and the intended photographing moment) is usually up to 0.3 seconds.

Accordingly, a specific ratio is selected as a camera internal setting for the number of frame images to be obtained before a shutter release signal is issued and the number of frame images to be obtained after the shutter release signal is issued, so as to ensure that a greater number (A) of frame images is obtained before the photographing instruction signal (shutter release signal) is issued compared to the number (B) of frame images obtained after the photographing instruction signal is issued. Thus, the likelihood of the image captured at the intended moment being included in the save candidates is increased for either type of photographer, i.e., one who performs a late shutter release operation or one who performs an early shutter release operation.

(5) All the frame images having been designated as save candidates or only the frame images each selected via an operation signal output from the operation member among the save candidates are save into the recording medium 30 by the main CPU 11 and the card interface (I/F) 17 in the electronic camera 1. Thus, since all the frame images designated as save candidates are not always recorded for save, the memory space occupied by the saved frame images in the recording medium 30 can be minimized.

(Variation 1)

Figure 3A:
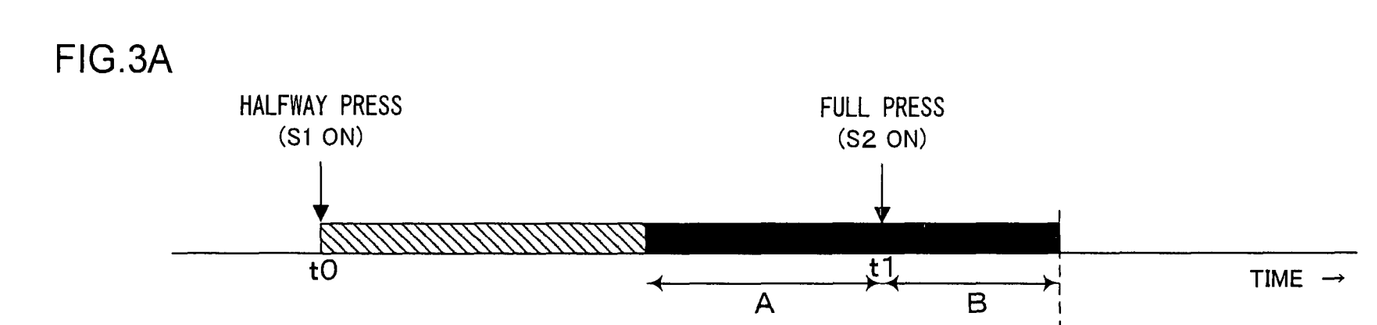
Figure 3B:
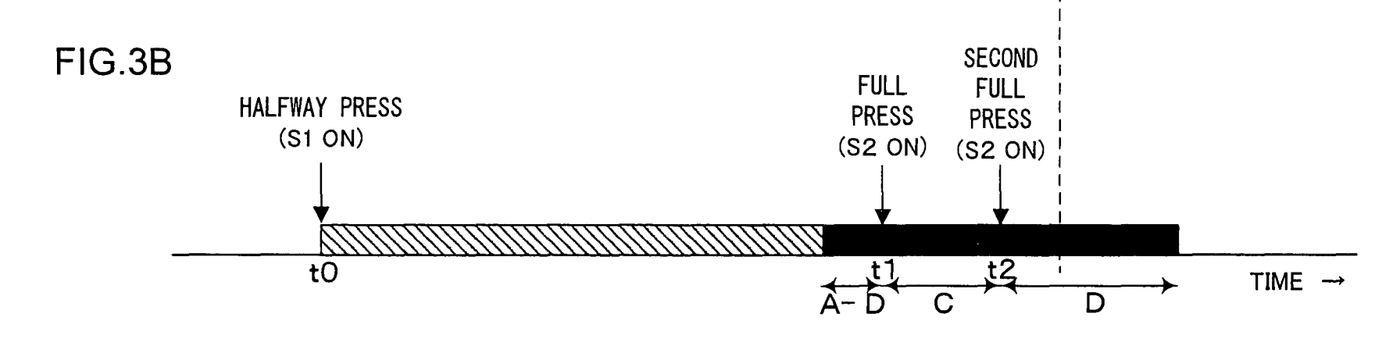

FIGS. 3A and 3B illustrate the timing with which images are obtained in the pre-capture photographing mode in variation 1. Since the timing indicated in FIG. 3A is similar to that of the pre-capture photographing operation executed under normal conditions having been described in reference to the embodiment, a repeated explanation is not provided.

(Pre-Capture Photographing Operation Executed Under Double-Depression Conditions)

In variation 1, a specific number of frames D (A>D≥B) is set in advance. FIG. 3B indicates that in response to a second full press operation signal input at a time point t2 before the operation for capturing the B sheets of frame images, having started at the time point t1, is completed, the main CPU 11 executes double-depression shutter release processing. During the double-depression shutter release processing, the main CPU 11 individually records (A−D) sheets of frame images, i.e., the newer frame images among the frame images having been captured before the time point t1, which have not been deleted through overwrite, C sheets of frame images having been captured during the period elapsing between the time point t1 and the time point t2 and D sheets of frame images captured following the time point t2 into the recording medium 30 by correlating them to one another.

The filled bar in FIG. 3B represents the period of time over which the {(A−D)+C+D} sheets of frame images, to be recorded into the recording medium 30, are obtained. The hatched bar represents the period of time over which frame images that are first stored into the buffer memory 15 but are subsequently deleted through overwrite are obtained.

It is to be noted that the following aspect of the operation executed in conjunction with the second recording method is identical to that of the normal pre-capture photographing operation. Namely, the main CPU 11 brings up on display at the liquid crystal monitor 19 a single frame image at a time or a predetermined number of frame images (e.g., four frame images) at a time among the {(A−D)+C+D} sheets of frame images before recording any of the frame images into the recording medium 30. Then, the main CPU 11 records only a specific frame image selected via an operation signal output from the operation member 18 into the recording medium 30. The filled bar in the timing chart of the operation executed by adopting the second recording method will represent the period of time over which the {(A−D)+C+D} sheets of frame images, i.e., save candidates any of which may be recorded into the recording medium 30, are obtained.

(Variation 2)

Figure 4A:
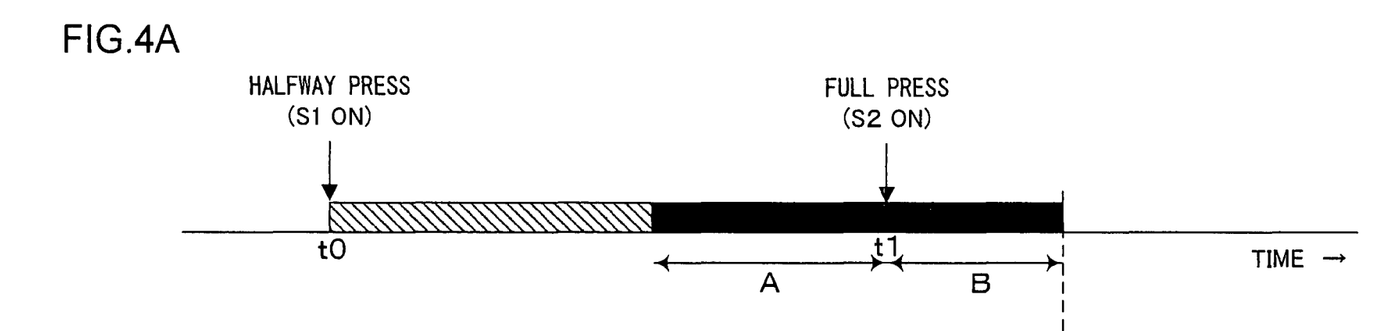
Figure 4B:
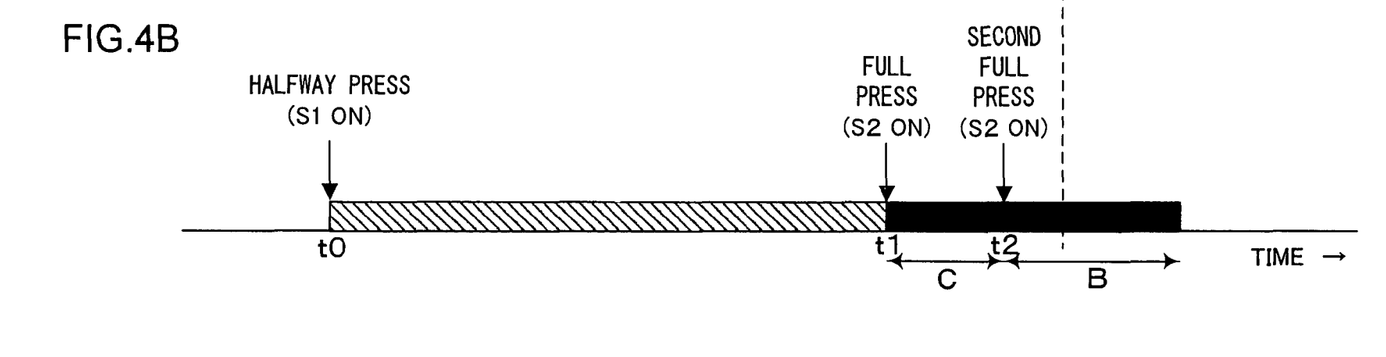

FIGS. 4A and 4B illustrate the timing with which images are obtained in the pre-capture photographing mode in variation 2. Since the timing indicated in FIG. 4A is similar to that of a pre-capture photographing operation executed under normal conditions having been described in reference to the embodiment, a repeated explanation is not provided.

(Pre-Capture Photographing Operation Executed Under Double-Depression Conditions)

In variation 2, any frame images having been obtained prior to the time point t1 are not recorded into the recording medium 30. FIG. 4B indicates that in response to a second full press operation signal input at a time point t2 before the operation for capturing the B sheets of frame images, having started at the time point t1, is completed, the main CPU 11 executes double-depression shutter release processing. During the double-depression shutter release processing, the main CPU 11 individually records C sheets of frame images having been captured during the period of time elapsing between the time point t1 and the time point t2 and B sheets of frame images captured after the time point t2 into the recording medium 30 by correlating them to each other.

The filled bar in FIG. 4B represents the period of time over which the (C+B) sheets of frame images, to be recorded into the recording medium 30, are obtained. The hatched bar represents the period of time over which frame images that are first stored into the buffer memory 15 and subsequently deleted through overwrite are obtained.

It is to be noted that the following aspect of the operation executed in conjunction with the second recording method is identical to that of the normal pre-capture photographing operation. Namely, the main CPU 11 brings up on display at the liquid crystal monitor 19 a single frame image at a time or a predetermined number of frame images (e.g., four frame images) at a time among the (C+B) sheets of frame images before recording any of the frame images into the recording medium 30. Then, the main CPU 11 records only a specific frame image selected via an operation signal output from the operation member 18 into the recording medium 30. The filled bar in the timing chart of the operation executed by adopting the second recording method will represent the period of time over which the (C+B) sheets of frame images, i.e., save candidates any of which may be recorded into the recording medium 30, are obtained.

(Variation 3)

Figure 5A:
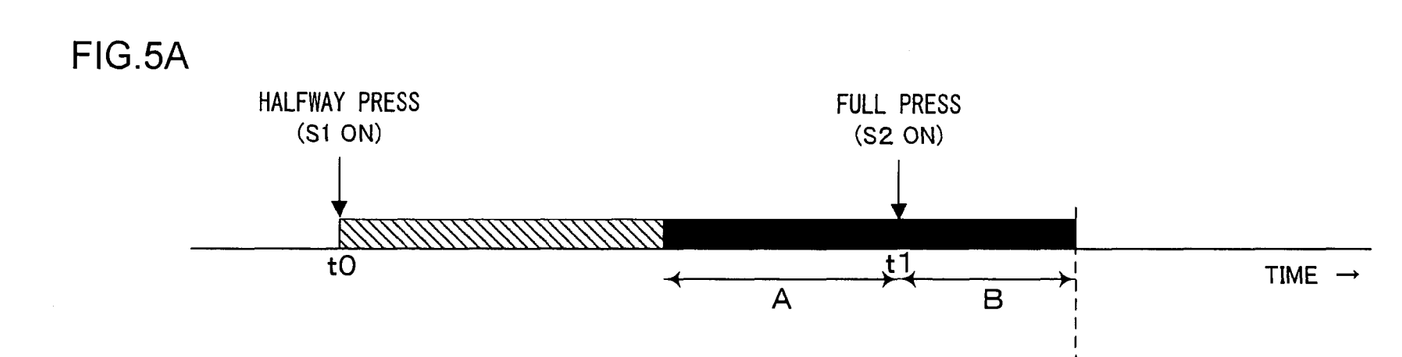
Figure 5B:
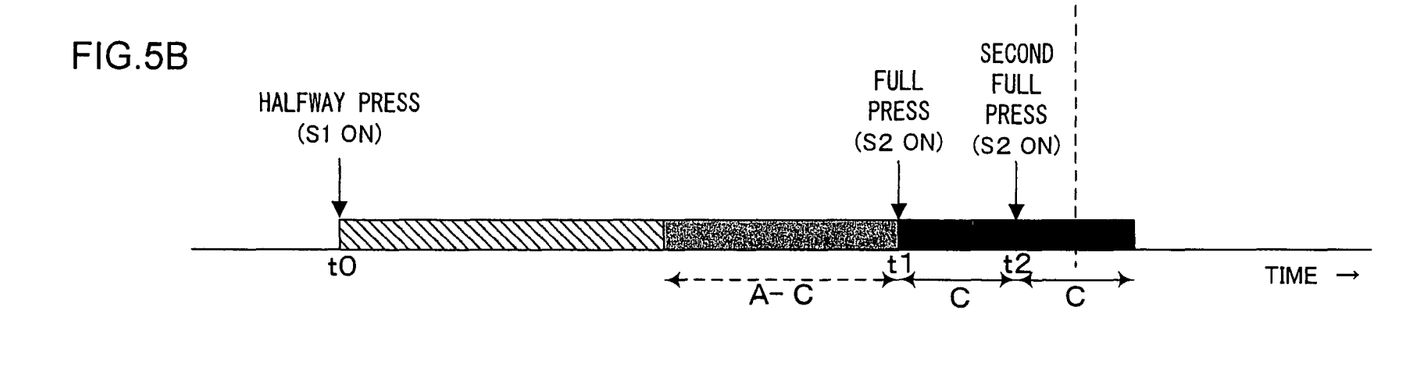

FIGS. 5A and 5B illustrate the timing with which images are obtained in the pre-capture photographing mode in variation 3. Since the timing indicated in FIG. 5A is similar to that of the pre-capture photographing operation executed under normal conditions having been described in reference to the embodiment, a repeated explanation is not provided.

(Pre-Capture Photographing Operation Executed Under Double-Depression Conditions)

In variation 3, frame images high on an "undesirability scale" among the frame images captured before the time point t1, are deleted through overwrite, regardless of the acquisition order with which the frame images are obtained. An undesirable image may be a frame image with a small data size (regardless of whether or not the image has undergone image compression) or a frame image having a low focus evaluation value calculated through the focus adjustment processing. Under normal circumstances, an out of focus image does not contain as much high frequency component data as an image in focus and for this reason, the data size of such an image having undergone image compression is bound to be small. In addition, the focus evaluation value calculated while adjusting the focusing condition through the contrast detection method is likely to assume a smaller value when the extent of defocus is greater. Accordingly, it is ensured that frame images in better focus are retained in the buffer memory 15 by allowing such undesirable frame images to be deleted through overwrite.

FIG. 5B indicates that in response to a second full press operation signal input at a time point t2 before the operation for capturing the B sheets of frame images, having started at the time point t1, is completed, the main CPU 11 executes double-depression shutter release processing. During the double-depression shutter release processing, the main CPU 11 individually records (A−C) sheets of frame images, i.e., the more desirable frame images among the frame images having been captured before the time point t1, which have not been deleted through overwrite, C sheets of frame images having been captured during the period elapsing between the time point t1 and the time point t2 and C sheets of frame images captured following the time point t2 into the recording medium 30, by correlating them to one another.

The following control is executed by the main CPU 11 in variation 3. Namely, the CPU 11 ensures that frame images having been obtained prior to the second depression time point t2 are saved in a quantity matching the number (C) of frame images recorded after the second depression. In addition, the main CPU 11 deletes through overwrite frame images higher on the undesirable scale among the frame images in the frames preceding the C sheets of frame images having been obtained prior to the time point t2, by writing new data over the least desirable frame image first, so as to retain frame images in the quantity that can be fitted into the available buffer memory space.

The filled bar in FIG. 5B represents the period of time over which the {(A−C)+C+C} sheets of frame images, to be recorded into the recording medium 30, are obtained.

The hatched bar represents the period of time over which frame images that are first stored into the buffer memory 15 but are subsequently deleted through overwrite are obtained.

It is to be noted that the following aspect of the operation executed in conjunction with the second recording method is identical to that of the normal pre-capture photographing operation. Namely, the main CPU 11 brings up on display at the liquid crystal monitor 19 a single frame image at a time or a predetermined number of frame images (e.g., four frame images) at a time among the {(A−C)+C+C} sheets of frame images before recording any of the frame images into the recording medium 30. Then, the main CPU 11 records only a specific frame image selected via an operation signal output from the operation member 18 into the recording medium 30. The filled bar in the timing chart of the operation executed by adopting the second recording method will represent the period of time over which the {(A−C)+C+C} sheets of frame images, i.e., save candidates any of which may be recorded into the recording medium 30, are obtained.

(Variation 4)

In the embodiment and the variations described above, the amount of buffer memory 15 to be used for the pre-capture photographing operation is controlled based upon the specific numbers of frame images to be obtained before and after the time point t1 and before and after the time point t2. Instead, the memory space allocated for the pre-capture photographing operation may be controlled based upon a specific memory capacity value. In such a case, the memory capacity required to accommodate a given number of frame images can be calculated by multiplying the data size of each frame image by the number of frame images.

(Variation 5)

The pre-capture photographing operation described above may be executed in a camera capable of capturing and recording movie. In such a case, the acquisition of a frame image to constitute a movie image and the acquisition of a frame image to constitute a still image (pre-captured image) should be executed alternately to each other. Namely, once a frame image to constitute a movie image is stored into a movie image buffer memory, the next frame image is stored as a still image into a still image buffer memory. In conjunction with an image sensor 22 capable of capturing images at 120 FPS, frame images are stored at 60 FPS into the movie image buffer memory and also at 60 FPS into the still image buffer memory.

The frame images to constitute the movie image having been stored into the movie image buffer memory are then recorded into a movie image recording medium. The still images having been stored into the still image buffer memory are used in the pre-capture photographing operation. At this time, memory control similar to the memory control under which the memory space in the buffer memory 15 is controlled, as described above, is executed by the main CPU 11 in order to control the memory space in the still image buffer memory.

Second Embodiment

In the second embodiment, if a second photographing instruction signal is issued after B sheets of frame images are obtained following the output of the initial photographing instruction signal, the main CPU 11 executes control so as to designate a plurality of frame images obtained before and after the second photographing instruction signal is issued as save candidates.

Figure 6:
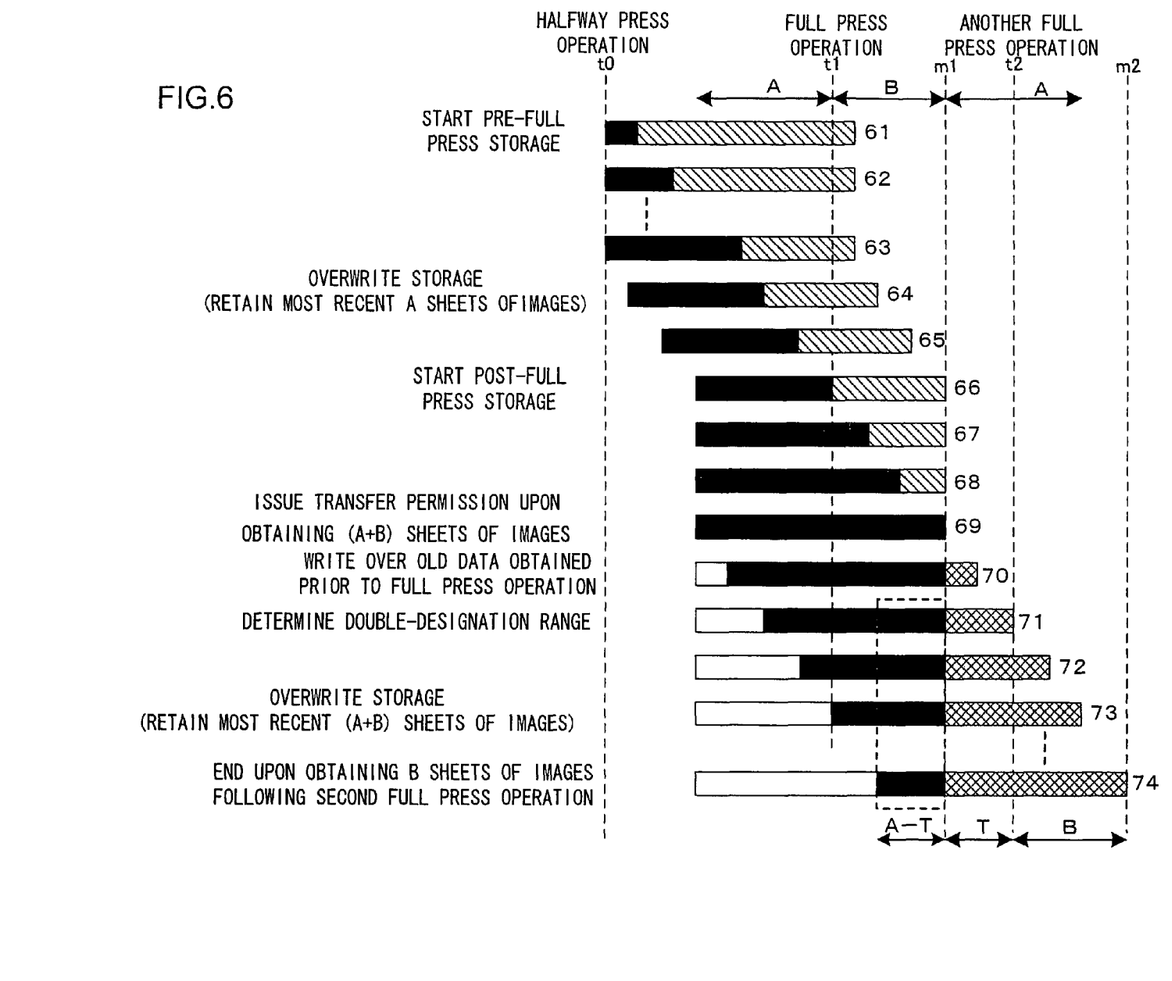
FIG. 6 illustrates the timing with which images are obtained as a double-depression operation is performed in a second embodiment.

FIG. 6 illustrates the timing with which images are obtained as the shutter release button is depressed twice in the pre-capture photographing mode in the second embodiment. The filled bars in FIG. 6 each represent a part of the buffer memory 15 taken up by frame images to be recorded into the recording medium 30. The hatched bars each represent an unoccupied part of the buffer memory 15. As a halfway press operation signal is input at a time point t0 in FIG. 6, the main CPU 11 starts shutter release standby processing (61). During the shutter release standby processing, the main CPU 11 executes exposure calculation and focus adjustment while capturing subject images at a frame rate of, for instance, 120 frames per second (120 FPS) and sequentially stores the image data thus obtained into the buffer memory 15.

Once the number of frame images stored into the buffer memory 15 after the time point t0 reaches a predetermined value (A frames in this example) the main CPU 11 deletes image data expressing frame images older than the most recent A sheets of frame images through overwrite by recording a newly captured frame image over the oldest frame image. Through these measures, the memory space in the buffer memory 15 used for the pre-capture photographing operation can be controlled to match the predetermined capacity allocation. 61~63 in FIG. 6 each indicate a state of the buffer memory 15 before the number of frame images stored therein reaches A sheets, whereas 64~66 each indicate a state of the buffer memory 15 where overwriting deletion is underway.

As a full press operation signal is input at a time point t1, the main CPU 11 starts shutter release processing. During the shutter release processing, B sheets of frame images are captured following the time point t1 (67~69). Then, the main CPU 11 individually records the A sheets of frame images having been captured prior to the time point t1 and the B sheets of frame images captured following the time point t1 into the recording medium 30 by correlating the frame images captured prior to and following the time point t1.

It is to be noted that as with the first embodiment, this embodiment is described by assuming that the first recording method in which the (A+B) sheets of frame images are all recorded into the recording medium 30, has been selected.

Upon capturing the B sheets of frame image at a time point m1 (69), which occurs later than the time point t1, the main CPU 11 issues a permission for transferring the (A+B) sheets of frame images in the buffer memory 15 so as to record into the recording medium 30. The main CPU 11 also continues to capture frame images beyond the time point m1 (70~71). In this situation, the main CPU 11 transfers the frame images to the recording medium 30 in chronological order, i.e., the oldest frame image among the A sheets of frame images having been obtained before the time point t1, is transferred first. Then, the CPU 11 stores a frame image newly obtained after the time point m1 into an area of the buffer memory 15 occupied by the oldest frame image having been transferred to the recording medium by writing the newer frame image over the older frame image. Through these measures, the memory space in the buffer memory 15 used for the pre-capture photographing operation can be controlled in an optimal manner. The crosshatched bars to the right of the time point m1 in FIG. 6 each represents a part of the buffer memory 15 into which newer frame images are written, whereas the unfilled bars to the left of the filled bars each represent a part of the buffer memory 15 having held older frame images which are subsequently deleted through overwrite, in order to accommodate the newly acquired frame images. In other words, the crosshatched bar and the blank bar are the same part of the buffer memory 15.

As a second shutter release button full press operation is performed and another full press operation signal is input at a time point t2 before the operation for capturing the A sheets of frame images, having started at the time point m1, is completed, the main CPU 11 executes double-depression shutter release processing. During this shutter release processing, the main CPU 11 captures B sheets of frame images after the time point t2 (72~74). Then, the main CPU 11 individually records the A sheets of frame images having been captured prior to the time point t2 and the B sheets of frame images captured after the time point t2 into the recording medium 30 by correlating them to each other.

Upon capturing the B sheets of frame image at a time point m2 (74), which occurs later than the time point t2, the main CPU 11 issues a permission for transferring the (A+B) sheets of frame images in the buffer memory 15 so as to record them into the recording medium 30. The main CPU 11 then ends the image-capturing operation. In addition, if there are any frame images having been obtained prior to the initial full press operation (prior to the time point t1) and remaining in the buffer memory 15, the main CPU 11 clears such frame images (issues an overwrite permission).

Figure 7:
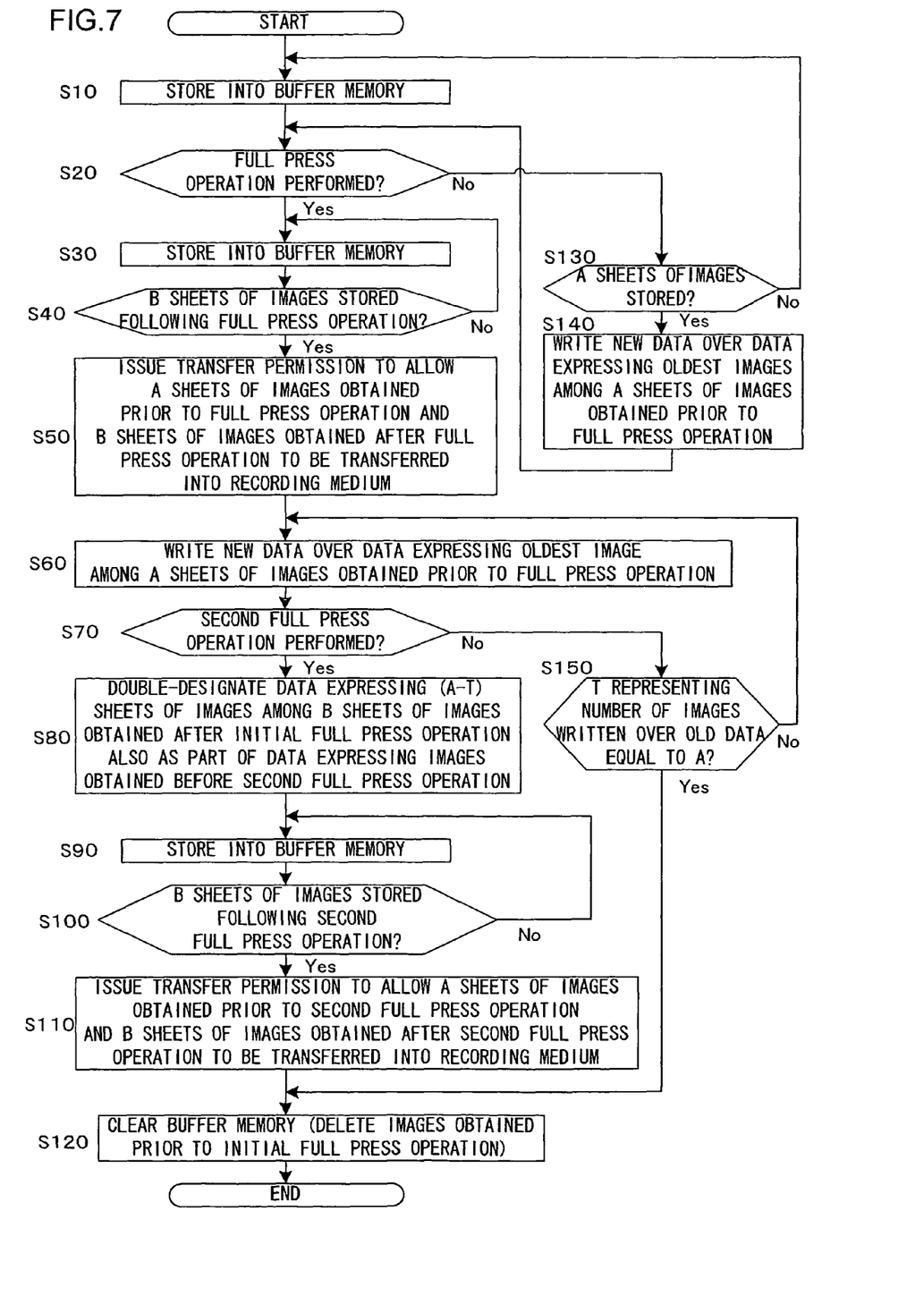
FIG. 7 presents a flowchart of processing that may be executed by the main CPU.

The flow of the processing executed by the main CPU 11 to enable pre-capture photographing operation with the timing indicated in FIG. 6 is now described in reference to the flowchart presented in FIG. 7. The main CPU 11 starts up the processing in FIG. 7 in response to an ON operation signal input thereto from the halfway press switch 18*a*.

In step S10 in FIG. 7, the main CPU 11 starts the shutter release standby processing for obtaining frame images and storing them into the buffer memory 15, and then the operation proceeds to step S20. In step S20, the main CPU 11 makes a decision as to whether or not a full press operation has been performed. If an ON operation signal has been input from the full press switch 18*b*, the main CPU 11 makes an affirmative decision in step S20 and the operation proceeds to step S30. However, if no ON operation signal has been input from the full press switch 18*b*, the main CPU 11 makes a negative decision in step S20 and the operation proceeds to step S130.

The operation proceeds to step S130 when the shutter release standby processing needs to be executed repeatedly. In step S130, the main CPU 11 makes a decision as to whether or not the number of frame images having been stored into the buffer memory 15 has reached A sheets. If A sheets of frame images have been stored in the buffer memory 15, the main CPU 11 makes an affirmative decision in step S130 and the operation proceeds to step S140. However, if the number of frame images in the buffer memory 15 has not reached A sheets, a negative decision is made in step S130 and the operation returns to step S10. If the operation returns to step S10, processing corresponding to 61~62 in FIG. 6 is continuously executed.

The operation proceeds to step S140 to execute processing corresponding to 63~65 in FIG. 6. In step S140, the main CPU 11 writes a newly captured frame image over the oldest frame image among the A sheets of frame images in the buffer memory 15 and thus stores the newly captured frame image in place of the oldest frame image. The operation then returns to step S20.

In step S30, the main CPU starts the shutter release processing for obtaining frame images and storing them into the buffer memory 15, and then the operation proceeds to step S40. In step S40, the main CPU 11 makes a decision as to whether or not the number of frame images having been stored into the buffer memory 15 following the full press operation (after the time point t1) has reached B sheets. If B sheets of frame images have been stored in the buffer memory 15, the main CPU 11 makes an affirmative decision in step S40 and the operation proceeds to step S50. However, if the number of frame images in the buffer memory 15 has not reached B sheets, a negative decision is made in step S40 and the operation returns to step S30. If the operation returns to step S30, processing corresponding to 66~68 in FIG. 6 is continuously executed.

In step S50, the main CPU 11 issues a transfer permission so as to allow the A sheets of frame images having been captured prior to the full press operation (prior to the time point t1) and the B sheets of frame images captured after the full press operation (after the time point t1) to be recorded into the recording medium 30, and then the operation proceeds to step S60. As a result, the frame images are transferred into the recording medium 30 while the processing in FIG. 7 is in progress. The frame images are transferred in a sequence matching the chronological order in which the frame images were captured, by transferring the oldest data (the oldest frame image) first.

In step S60, the main CPU 11 stores a newly captured frame image by writing the new frame image over the oldest frame image among the A sheets of frame images in the buffer memory 15 having been captured prior to the full press operation (prior to the time point t1). The operation then proceeds to step S70, in which the main CPU 11 makes a decision as to whether or not another full press operation has been performed. If an ON operation signal has been input from the full press switch 18b, the main CPU 11 makes an affirmative decision in step S70 and the operation proceeds to step S80. However, if no ON operation signal has been input from the full press switch 18b, the main CPU 11 makes a negative decision in step S70 and the operation proceeds to step S150.

Based upon the processing executed in step S150, either the shutter release standby processing is repeatedly executed or the pre-capture photographing processing ends. In step S150, the main CPU 11 makes a decision as to whether or not the number of frame images having been stored into the buffer memory 15 through overwrite has reached A sheets. If the number of frame images having been stored through overwrite has reached A sheets, the main CPU 11 makes an affirmative decision in step S150 and the operation proceeds to step S120, following which, the pre-capture photographing processing ends. If the number of frame images having been stored in the buffer memory 15 through overwrite has not reached A sheets, the main CPU 11 makes a negative decision in step S150 and the operation returns to step S16. The operation returns to step S60 to continuously execute processing corresponding to 70~71 in FIG. 6.

In step S80, the main CPU 11 co-designates the data expressing the more recently captured (A−T) sheets of frame images among the B sheets of frame images in the buffer memory 15 having been captured following the initial full press operation (following the time point t1), also as data expressing images captured prior to the second full press operation (prior to the time point t2), and then the operation proceeds to step S90. The timing with which the (A−T) sheets of frame images are obtained is indicated as the range enclosed by the dotted lines in FIG. 6.

In step S90, the main CPU 11 starts the double-depression shutter release processing in order to obtain frame images and store them into the buffer memory 15 and then the operation proceeds to step S100. In step S100, the main CPU 11 makes a decision as to whether or not the number of frame images having been stored into the buffer memory 15 following the second full press operation (following the time point t2) has reached B sheets. If the number of frame images having been stored has reached B sheets, the main CPU 11 makes an affirmative decision in step S100 and the operation proceeds to step S110, whereas if the number of frame images has not reached B sheets, a negative decision is made in step S100 and the operation returns to step S90. The operation returns to step S90 to continuously execute processing corresponding to 72~73 in FIG. 6.

In step S110, the main CPU 11 issues a transfer permission so as to allow the A sheets of frame images having been captured prior to the second full press operation (prior to the time point t2) and the B sheets of frame images captured after the second full press operation (after the time point t2) to be recorded into the recording medium 30, and then the operation proceeds to step S120. As a result, the frame images are transferred into the recording medium 30 while the processing in FIG. 7 is in progress. The frame images are transferred in a sequence matching the chronological order in which the frame images were captured, by transferring the oldest data (the oldest frame image) first.

In step S120, the main CPU 11 clears (issues an overwrite permission for) any frame image in the buffer memory 15 having been obtained prior to the initial full press operation (before the time point t1) before ending the processing in FIG. 7.

The following advantages are achieved through the second embodiment described above.

(1) The electronic camera 1 includes the main CPU 11, the image sensor 22, which obtains frame images over predetermined time intervals, and the buffer memory 15 into which a plurality of frame images obtained via the image sensor 22 are sequentially stored. The main CPU 11 issues a photographing instruction signal and designates a plurality of frame images obtained before and after the photographing instruction signal is issued, among the plurality of frame images stored in the buffer memory 15, as save candidate frame images that may be saved into the recording medium 30. In addition, if another photographing instruction signal is issued within a predetermined period of time following the output of the initial photographing instruction signal, the main CPU 11 executes control so as to designate as save candidates a plurality of frame images obtained before and after each photographing instruction signal is issued. As a result, an image-capturing device, capable of saving a plurality of optimal frame images even when a second photographing instruction is issued following the initial photographing instruction, is provided.

(2) Under normal circumstances, the main CPU 11 designates A sheets of frame images obtained before a photographing instruction signal is issued and B sheets of frame images obtained after the photographing instruction signal is issued as save candidates. After B sheets of frame images have been stored into the buffer memory 15 following the output of the first photographing instruction signal, subsequent frame images obtained via the image sensor 22 are continuously stored into the buffer memory 15 in sequence. As more frame images are obtained following the output of the first photographing instruction signal, a second photographing instruction signal may be issued before additional A sheets of frame images are obtained. Under such circumstances, the main CPU 11 executes control so as to designate as save candidates pluralities of frame images obtained before and after the outputs of the first and second photographing instruction signals. As a result, an image-capturing device, distinguishable from that achieved in the first embodiment in that it allows frame images to be saved in an optimal manner even if another photographing instruction signal is generated after the acquisition of the B sheets of frame images, to be obtained in response to the initial photographing instruction, is completed, is achieved.

(3) The main CPU 11 executes control so as to co-designate some (e.g., A−T) sheets of frame images among the B sheets of frame images obtained after the output of the first photographing instruction signal also as part of the group of A sheets of frame images obtained prior to the output of the second photographing instruction signal. By allowing some frame images among the B sheets of frame images to be counted as part of the group of A sheets of frame images, better efficiency in the utilization of space in the buffer memory 15 is assured.

(4) The buffer memory 15 adopts a structure that allows any additional frame images, following the B sheets of frame images having been stored after the output of the first photographing instruction signal, to be stored in sequence through overwrite so that each additional frame image is written over the oldest frame image among the A sheets of frame images having been obtained prior to the output of the first photographing instruction signal. Compared to a buffer memory 15 where data are stored into available memory space without writing over old data, the buffer memory 15 can be utilized more economically.

(Variation 6)

In the second embodiment described above, the (A+B) sheets of frame images obtained before and after the first full press operation (time point t1) and the (A+B) sheets of frame images obtained before and after the second full press operation (time point t2) are both recorded into the recording medium 30. As an alternative, a structure that effects a switchover to record only the (A+B) sheets of frame images obtained before and after the second full press operation (time point t2) into the recording medium 30 in response to a user operation may be adopted. Such a switchover may be effected in response to a menu operation performed by the user via the operation member 18.

(Variation 7)

The image data expressing the (A−T) sheets of frame images co-designated in step S80 may be included both in a file containing the (A+B) sheets of frame images obtained before and after the first full press operation (time point t1) and in a file containing the (A+B) sheets of frame images obtained before and after the second full press operation (time point t2). As an alternative, the (A−T) sheets of frame images may be included in only either one of the files and may be cross-referenced from the other file.

(Variation 8)

In addition, when including the image data expressing the (A−T) sheets of frame images both in the file containing the (A+B) sheets of frame images obtained before and after the first full press operation (time point t1) and in the file containing the (A+B) sheets of frame images obtained before and after the second full press operation (time point t2), the data size of the (A−T) sheets of frame images may be reduced before adding them to the files by, for instance, compressing the (A−T) sheets of frame images or converting the (A−T) sheets of frame images into a thumbnail format.

(Variation 9)

In the second embodiment and variations thereof, the amount of buffer memory 15 to be used for the pre-capture photographing operation is controlled based upon the specific number of frame images to be obtained. Instead, the memory space allocated for the pre-capture photographing operation may be controlled based upon a specific memory capacity value. In such a case, the memory capacity required to accommodate a given number of frame images can be calculated by multiplying the data size of each frame image by the number of frame images.

The above described embodiments are examples, and various modifications can be made without departing from the scope of the invention.

What is claimed is:

1. An image-capturing device, comprising:
   an instruction unit that issues a photographing instruction signal;
   an image sensor that obtains still images over predetermined time intervals;
   a storage unit into which a plurality of still images obtained via the image sensor are sequentially stored;
   a save candidate designation unit that designates A sheets of still images obtained prior to the output of the photographing instruction signal and B sheets of still images obtained after the output of the photographing instruction signal among a plurality of still images stored in the storage unit as save candidate images that may be saved into a recording medium; and
   a control unit that controls the save candidate designation unit wherein;
   if a second photographing instruction signal is issued at a time point at which C (A>C) sheets of still images, fewer than B sheets, have been obtained following the output of the first photographing instruction signal, the control unit controls the save candidate designation unit so as to designate as the save candidates most recent (A−C) sheets of still images among the A sheets of still images having been obtained prior to the output of the first photographing instruction signal, the C sheets of still images having been obtained after the output of the first photographing instruction signal and B sheets of still images obtained after the output of the second photographing instruction signal.

2. The image-capturing device according to claim 1, wherein:
   the control unit controls the save candidate designation unit so as to select as the (A−C) sheets of still images either (A−C) sheets of still images in a compressed state with largest volumes of information among the A sheets of still images in the compressed state with an image with a largest volume of information selected first or (A−C) sheets of still images achieving highest levels of contrast in focus adjustment target areas each set in correspondence to a given image among the A sheets of still images with an image with the highest contrast selected first.

3. The image-capturing device according to claim 1, wherein:

the control unit controls the save candidate designation unit so as to ensure that the A sheets of still images are greater in quantity than the B sheets of still images.

4. The image-capturing device according to claim 1, further comprising:
a save processing unit that saves into the recording medium the plurality of still images into a recording medium, wherein:
the save processing unit saves all the save candidates designated by the save candidate designation unit or each candidate among the save candidates indicated in an operation signal output from an operation member.

5. An image-capturing device, comprising:
an instruction unit that issues a photographing instruction signal;
an image sensor that obtains still images over predetermined time intervals;
a storage unit into which a plurality of still images obtained via the image sensor are sequentially stored;
a save candidate designation unit that designates a plurality of still images obtained before and after an output of the photographing instruction signal among the plurality of still images stored in the storage unit as save candidate images that may be saved into a recording medium; and
a control unit that controls the save candidate designation unit so as to designate as the save candidates a plurality of still images obtained before and after an output of each photographing instruction signal if a second photographing instruction signal is issued within a predetermined length of time following the output of the photographing instruction signal, wherein:
the save candidate designation unit designates A sheets of still images obtained prior to the output of the photographing instruction signal and B sheets of still images obtained after the output of the photographing instruction signal as the save candidates, and
if a second photographing instruction signal is issued at a time point at which C (A>C) sheets of still images, fewer than B sheets, have been obtained following the output of the first photographing instruction signal, the control unit controls the save candidate designation unit so as to designate as the save candidates most recent (A−C) sheets of still images among the A sheets of still images having been obtained prior to the output of the first photographing instruction signal, the C sheets of still images having been obtained after the output of the first photographing instruction signal and B sheets of still images obtained after the output of the second photographing instruction signal.

6. The image-capturing device according to claim 5, wherein:
the storage unit continuously takes in still images obtained at the image sensor sequentially for storage after storing the B sheets of still images following the output of a first photographing instruction signal; and
if the second photographing instruction signal is issued before additional A sheets of still images are obtained in succession to the B sheets of still images having been obtained following the output of the first photographing instruction signal, the control unit controls the save candidate designation unit so as to designate as the save candidates a plurality of still images obtained before and after the output of each of the first photographing instruction signal and the second photographing instruction signal.

7. The image-capturing device according to claim 6, wherein:
the control unit controls the save candidate designation unit so as to double-designate some still images among the B sheets of still images obtained after the output of the first photographing instruction signal also as part of a group of A sheets of still images obtained prior to the output of the second photographing instruction signal.

8. The image-capturing device according to claim 7, wherein:
the save candidate designation unit designates as the save candidates images in a first file containing the plurality of still images obtained before and after the output of the first photographing instruction signal and also designates as the save candidates images in a second file containing the plurality of still images obtained before and after the output of the second photographing instruction signal.

9. The image-capturing device according to claim 8, wherein:
the save candidate designation unit performs one of;
(1) including the some still images both in the first file and in the second file;
(2) including the some still images only one of the first file and the second file and referencing the some still images from another file; and
(3) reducing the data size of the some still images and then adding the some still images with the reduced data size into at least the second file.

10. The image-capturing device according to claim 6, wherein:
any additional images, stored into the storage unit sequentially after storing the B sheets of still images following the output of the first photographing instruction signal, are each written over an oldest still image among the A sheets of still images having been obtained prior to the output of the first photographing instruction signal.

* * * * *